United States Patent [19]
Kolla et al.

[11] Patent Number: 5,744,188
[45] Date of Patent: Apr. 28, 1998

[54] PROCESS FOR PREPARING DEHYDRATED BEAN PRODUCTS

[75] Inventors: Shanti Kolla, Ontario; Ash Husain, Chino Hills; Jerry Costales, Fullerton, all of Calif.

[73] Assignee: Hunt-Wesson, Inc., Fullerton, Calif.

[21] Appl. No.: 667,115

[22] Filed: Jun. 19, 1996

[51] Int. Cl.$^6$ .................................................. A23L 1/201
[52] U.S. Cl. .................... 426/629; 426/464; 426/516; 426/518; 426/465
[58] Field of Search ............................ 426/464, 516, 426/518, 629, 465

[56] References Cited

U.S. PATENT DOCUMENTS

| | | |
|---|---|---|
| 1,088,741 | 3/1914 | Stephens . |
| 2,297,502 | 9/1942 | Rudolf .................................. 426/629 |
| 2,657,999 | 11/1953 | Rauch . |
| 3,642,494 | 2/1972 | Wagner . |
| 4,075,361 | 2/1978 | Oberg .................................. 426/629 |
| 4,407,840 | 10/1983 | Lathrop et al. . |
| 4,676,990 | 6/1987 | Huffman et al. . |
| 4,735,816 | 4/1988 | Sterner et al. . |
| 4,871,567 | 10/1989 | Sterner et al. . |

*Primary Examiner*—Helen Pratt
*Attorney, Agent, or Firm*—Pretty, Schroeder & Poplawski

[57] ABSTRACT

Disclosed is a process for preparing rapidly reconstitutable, dehydrated legume products. Raw legumes are hydrated by treating, first with an alkaline solution to raise their pH to from about 6.7 to about 7.7 and their moisture content by at least about 5 wt. % to from about 30 to about 45 wt. %, and then by neutralizing with an acidic solution to lower their pH to from about 5.5 to about 6.5 and raise their moisture content by at least about 5 wt. % to from about 45 to about 60 wt. %. The hydrated beans are then cooked and dehydrated to produce legume products having the appearance and taste of their freshly prepared counterparts.

31 Claims, No Drawings

PROCESS FOR PREPARING DEHYDRATED BEAN PRODUCTS

BACKGROUND OF THE INVENTION

1. Field of the Invention

This invention relates to the chemical arts. In particular, it relates to a method for preparing dehydrated bean and other legume products that are quickly reconstituted upon the addition of water.

2. Discussion of the Related Art

Beans are an excellent source of proteins, carbohydrates, lipids, vitamins and minerals, and as such they are a highly nutritious and important part of the human diet. In the United States, beans are consumed primarily in the cooked state. Cooking the beans provides numerous advantages. For example, cooked beans are easier to digest than raw beans.

Numerous attempts have been made to make dehydrated, cooked beans in a manner so that they can be quickly reconstituted and thus easily prepared, particularly by food service organizations, such as restaurants, hospitals, school cafeterias, and the like. Of course, important to any such process is that the taste and appearance of the reconstituted beans are comparable to the taste and appearance of freshly prepared bean products.

To improve the overall efficiency of the process for making dehydrated beans, it is known to hydrate raw beans before cooking and dehydration. The three major methods used to hydrate beans are: soaking for eight to sixteen hours at room temperature; blanching in hot water, typically 180°–212° F., for twenty to forty minutes; and high-temperature, short-time steam infusion for twenty to thirty minutes. Unfortunately, each of these different methods has various drawbacks. For example, soaking beans for eight to sixteen hours is a very time-intensive operation. Furthermore, blanching beans in hot water and subjecting the beans to high-temperature, short time steam infusion are both energy intensive, as well as being somewhat time-intensive.

Accordingly, there has existed a definite need for an improved process for preparing dehydrated beans and other legumes, so that they can be easily reconstituted to provide products having the taste and appearance of freshly prepared products. There has existed a still further need for an improved method for hydrating raw beans and other legumes, in a quick and energy-efficient manner, to be used in such a process. The present invention satisfies these and other needs and provides further related advantages.

SUMMARY OF THE INVENTION

The present invention is embodied in a novel method for preparing rapidly reconstitutable, dehydrated legume products. Raw legumes, such as raw beans, are hydrated by first treating the raw legumes with an alkaline solution under conditions sufficient to raise the pH of the legumes to from about 6.7 to about 7.7 and the moisture content to from about 30 to about 45 wt. % and then neutralizing the thus treated legumes with an acidic solution under conditions sufficient to lower their pH to from about 5.5 to about 6.5 and raise their moisture content by at least about 5 wt. % to from about 40 to about 60 wt. %.

In some embodiments, the raw legumes are initially treated at a temperature of from about 160° to about 200° F. for a period of from about thirty to about eighty minutes with an alkaline solution formed from sodium bicarbonate or sodium hydroxide, until the pH of the legumes is from about 7.2 to about 7.6 and the moisture content is from about 35 to about 45 wt. %. Also in some embodiments, the alkali-treated legumes are neutralized at a temperature of from about 150° to about 190° F. for a period of from about twenty to about thirty minutes with an acidic solution formed from hydrochloric acid, until the pH of the legumes is about 6.1 and the moisture content is about 45 to about 55 wt. %.

The hydrated legumes are then cooked, for example by steam heating, and dehydrated, so that their moisture content is less than about 10 wt. %. In some embodiments, a low-pressure, forming extruder or a flaking mill is used to reduce the size and to shape the cooked legumes, before dehydration. Upon reconstitution with hot water, the resulting products have the taste and appearance of their freshly prepared counterparts.

DETAILED DESCRIPTION OF THE PREFERRED EMBODIMENTS

The process in accordance with the invention is useful with most legumes including peas; soybeans; sweet peas; lentils; and beans, such beans of the genus phaseolus, common beans such as cranberry, lima, large white, small white, pinto, pink, kidney, garbanzo or black beans, and beans of the genus vigna, such as black eye beans. The method is of particular use in making dehydrated bean products, and when the final product is a dehydrated, refried bean product, pinto beans are most preferred. For convenience, therefore, the inventive process will be described with respect to pinto beans.

The raw pinto beans can be either whole or split. They are cleaned and destoned using conventional techniques and then washed or rinsed to remove any remaining dirt or other contaminants. Typically, the resulting pinto beans have a pH of about 6.4 and a moisture content of from about 5 to about 18 wt. %.

The beans are then hydrated in two stages. In the first stage, the raw beans are treated with boiling water (ca. 160°–200° F.) containing a mild alkali. Any alkali compatible with preparing an edible food product can be employed. Preferred alkalis include sodium bicarbonate or sodium hydroxide and solutions containing from about 0.2 to about 1.2 wt. %, preferably about 0.6 wt. %, are most preferred.

The beans are added to the alkaline solution in a suitable vessel, such as a scraped surface kettle, and treated for a period of from about thirty to about eighty minutes. During the first stage, the beans are treated until they have a pH of about 6.7 to about 7.7, more preferably from about 7.2 to about 7.6, and a moisture content of from about 30 to about 45 wt. %, preferably from about 35 to about 45 wt. %.

In the second stage, the beans are neutralized with an acidic solution having a temperature of from about 150° to about 190° F. Any food-compatible acid can be used. Hydrochloric acid is a preferred acid and solutions of 0.08N hydrochloric acid are most preferred. During this second stage, the heating is continued for twenty to thirty minutes, until the beans have a pH of about 6.1 and a moisture content that has been increased by at least about 5 wt. % to about 45 to about 55 wt. %. The total time for hydration is only from about sixty to about ninety minutes.

The hydrated beans are then dewatered by passing them over a perforated screen and the drain water can be recycled. Next, the beans are cooked under pressure to rupture the starch granules and completely gelatinize the starch. In preferred embodiments, the beans are steam-cooked in a batch or continuous stationary pressure cooker for from about fifty-five to about ninety minutes at a temperature of from about 240° to about 250° F. and at a pressure of from about 15 to about 30 psig.

In those embodiments where the desired final product are whole beans, the cooked, whole beans are dehydrated using conventional methods, such as by a forced-air, belt drying system. Their moisture content is reduced to less than about 10 wt. %, preferably from about 5 to about 8 wt. %. The resulting dehydrated, whole beans can be reconstituted by adding hot water to produce rehydrated beans having a flavor and appearance comparable to freshly prepared beans. It has been discovered that the longer the cooking time, the shorter the rehydration time. Accordingly, to maximize consumer convenience and minimize the time rquired to reconstitute the beans, it is desirable that they be cooked for at least about 70 minutes. When cooked for this length of time, the beans are rehydrated in less than 10 minutes.

In those embodiments where the desired final product is refried beans or other smooth-style product, whole or split beans are reduced in size and formed prior to complete dehydration. In one embodiment, the cooked beans are conveyed through a low-pressure, forming extruder fitted with a die plate having an opening of about 1/16". In another embodiment, a high-performance, flaking mill is used and the beans are compressed between steam heated rolls. With a flaking mill, the whole beans are not only formed into flakes, but, simultaneously, their moisture content is reduced to about 30 to about 40 wt. %.

The moisture content of the thus formed beans is then reduced using, for example, a forced-air, belt drying system, as discussed above, to produce a dehydrated product. If desired, seasonings, spices, and flavorings can be added to the product using a ribbon blender. Bean particles also can be blended with the formed, dehydrated beans, in any proportion, to produce a desired appearance when the product is reconstituted. Upon addition of hot water, the dehydrated product easily reconstitutes into a smooth-style product, such as a taco or burrito filling or dip, having both a pleasing taste and appearance. As previously discussed, there is an inverse relationship between the time the beans are cooked and the time it takes for them to be reconstituted. Smooth-style products can be easily reconstituted in less than about 10 minutes, if the beans are cooked for at least about 70 minutes.

While the invention has been described in detail with reference to certain preferred embodiments thereof, it will be understood that modifications and variations are within the spirit and scope of that which is described and claimed.

That which is claimed is:

1. A process for preparing rapidly reconstitutable, dehydrated legume products comprising the steps of:
   (a) hydrating raw legumes by
      (i) treating the raw legumes with an alkaline solution under conditions sufficient to raise the pH of the legumes to from about 6.7 to about 7.7 and the moisture content to from about 30 to about 45 wt. %;
      (ii) neutralizing the thus alkali-treated legumes with an acidic solution under conditions sufficient to lower their pH to from about 5.5 to about 6.5 and raise their moisture content by at least 5 wt. % to from about 40 to about 60 wt. %;
   (b) cooking the hydrated legumes; and then
   (c) dehydrating the thus cooked legumes.

2. The process in accordance with claim 1, wherein the raw legumes are pinto, pink, kidney, garbanzo or black beans.

3. The process in accordance with claim 2, wherein the raw legumes are pinto beans.

4. The process in accordance with claim 2, wherein the mildly alkaline solution is formed from sodium bicarbonate or sodium hydroxide.

5. The process in accordance with claim 4, wherein the raw beans are treated at a temperature of from about 160° to about 200° F. for a period of from about 30 to about 80 minutes.

6. The process in accordance with claim 4, wherein the pH of the alkali-treated beans is from about 7.2 to about 7.6.

7. The process in accordance with claim 4, wherein the moisture content of the alkali-treated beans is from about 35 to 45 wt. %.

8. The process in accordance with claim 2, wherein the acidic solution is formed from hydrochloric acid.

9. The process in accordance with claim 8, wherein the alkali-treated beans are neutralized at a temperature of from about 150° to about 190° F. for a period of from about 20 to about 30 minutes.

10. The process in accordance with claim 8, wherein the pH of the neutralized beans is about 6.1.

11. The process in accordance with claim 8, wherein the moisture content of the neutralized beans is from about 45 to about 55 wt. %.

12. The process in accordance with claim 2, wherein the total time for hydration is from about 60 to about 90 minutes.

13. The process in accordance with claim 2, further comprising dewatering the hydrated beans, before cooking.

14. The process in accordance with claim 13, wherein the hydrated beans are cooked by steam heating in a pressurized vessel.

15. The process in accordance with claim 14, wherein the hydrated beans are cooked for from about 55 to about 90 minutes.

16. The process in accordance with claim 15, wherein the hydrated beans are cooked for at least about 70 minutes.

17. The process in accordance with claim 2, wherein the beans are dehydrated using a forced-air, belt drying system.

18. The process in accordance with claim 17, wherein the moisture content of the dehydrated beans is less than about 10 wt. %.

19. The process in accordance with claim 18, wherein the moisture content of the dehydrated beans is from about 5 to about 8 wt. %.

20. The process in accordance with claim 2, further comprising reducing the beans in size and forming the beans after cooking, but before dehydration.

21. The process in accordance with claim 20, wherein the beans are reduced and formed by a low-pressure, forming screw extruder.

22. The process in accordance with claim 20, wherein the beans are reduced and formed by a flaking mill.

23. A process for preparing rapidly reconstitutable, dehydrated bean products comprising the steps of:
   (a) hydrating raw beans by
      (i) treating the raw beans with an alkaline solution at a temperature of from about 160° to about 200° F. for a period of from about 30 to about 80 minutes to raise the pH of the beans to from about 7.2 to about 7.6 and the moisture content to from about 35 to about 45 wt. %;
      (ii) neutralizing the thus alkali-treated beans with an acidic solution at a temperature of from about 150° to about 190° F. for a period of from about 20 to about 30 minutes to lower their pH to about 6.1 and raise their moisture content by at least about 5 wt. % to from about 45 to about 55 wt. %;

(b) cooking the hydrated beans by steam heating in a pressurized vessel for a period of from about 55 to about 90 minutes;

(c) reducing the beans in size and forming the beans; and then (d) dehydrating the thus cooked beans to a moisture content of less than about 10 wt %.

24. The process in accordance with claim 23, wherein the raw beans are pinto beans.

25. The process in accordance with claim 24, wherein the mildly alkaline solution is formed from sodium bicarbonate or sodium hydroxide.

26. The process in accordance with claim 24, wherein the acidic solution is formed from hydrochloric acid.

27. The process in accordance with claim 24, wherein the total time for hydration is from about 60 to about 90 minutes.

28. The process in accordance with claim 24, wherein the beans are cooked for at least about 70 minutes.

29. The process in accordance with claim 24, wherein the beans are reduced and formed by a low-pressure, forming screw extruder.

30. The process in accordance with claim 24, wherein the beans are reduced and formed by a flaking mill.

31. The process in accordance with claim 24, wherein the moisture content of the dehydrated beans is from about 5 to about 8 wt. %.

* * * * *